United States Patent [19]

Plisky

[11] 3,772,730
[45] Nov. 20, 1973

[54] WINDSHIELD WIPER BLADE ASSEMBLY
[75] Inventor: John J. Plisky, Munster, Ind.
[73] Assignee: The Anderson Company
[22] Filed: May 26, 1972
[21] Appl. No.: 257,096

[52] U.S. Cl. ............................................ 15/250.42
[51] Int. Cl. ......................... A47l 1/00, B60s 1/02
[58] Field of Search .................... 15/250.31, 250.32, 15/250.35, 250.36, 250.42

[56] References Cited
UNITED STATES PATENTS
3,414,931  12/1968  Kodama ............................ 15/250.42
3,629,898  12/1971  Plisky ................................ 15/250.42

Primary Examiner—Peter Feldman
Attorney—Hofgren, Wegner, Allen, Stellman & McCord

[57] ABSTRACT

This invention relates to windshield wiper assemblies which include a wiping element and an articulated pressure-distributing superstructure operatively connected together so as to transmit and distribute the pressure received by the pressure-distributing superstructure from the wiper arm to spaced locations along the length of the wiping element. The pressure-distributing superstructure comprises at least one lower member having an inverted V-shaped cross section and an upper member also having an inverted V-shaped cross section. The upper member is rockably connected to the lower member by a pair of inturned tabs seated in a pair of notches in the lower member. The upper and lower members have, at least proximate the rockable connection of these members, congruent cross-sectional shapes and the top of the end of the upper member is disposed further outwardly than its bottom. The lower member has a recess in its top ridge immediately below the end of the upper member.

2 Claims, 5 Drawing Figures

PATENTED NOV 20 1973 3,772,730

3,772,730

WINDSHIELD WIPER BLADE ASSEMBLY

BACKGROUND OF THE INVENTION

1. Field of the Invention

This invention relates to improvements in the articulated pressure-distributing superstructure of windshield wiper assemblies of the type which comprises at least one lower member having an inverted V-shaped cross section and an upper member having an inverted V-shaped cross section which is rockably connected to the lower member by a pair of inturned tabs seated in a pair of notches in the lower member.

2. Description of the Prior Art

Since the introduction in the 1940's of windshield wiper assemblies of the type generally shown in the John W. Anderson U.S. Pat. No. 2,596,063, such windshield wiper assemblies and variations thereof have been generally used throughout the automotive industry. These windshield wiper assemblies typically include a wiping element and a superstructure which is slidably attached to the wiping element and which consists of articulated parts so that pressure received from the wiper arm is transmitted through the superstructure to spaced locations along the wiping element for conformance to the windshield to be wiped. The wiping element consists of a resiliently flexible backing strip or support member, typically made of metal, and a resilient wiping member, typically made of rubber, which has a lowermost portion or lip adapted to wipe a windshield.

One successful variation of such windshield wiper assemblies has been one in which the superstructure is made of articulated parts of members which have inverted V-shaped cross sections, the upper member of the superstructure being rockably connected to a lower member by a pair of inturned tabs seated in a pair of notches in the lower member, these members having congruent cross-sectional shapes at least proximate the rockable connection of these members. As modern automobile manufacturers demanded longer and longer blades, the precision of the fit between the two members at the rockable connection became more and more important. When the two members do not fit together at the rockable connection with considerable precision, the two members rattle against each other to produce undesirable noise, the layover or tilt of the wiping element is not adequately controlled with resultant poor wiping and undesired relative movement of the two members produces wear. If the rockable connection does not function freely, the pressure-distributing superstructure does not articulate properly which adversely affects the operation of the wiping element and hence the wiping action.

SUMMARY OF THE INVENTION

A windshield wiper blade assembly of the type with which the invention is concerned comprises a wiping element and an articulated pressure-distributing superstructure adapted to receive pressure from an arm and distribute the pressure to spaced locations on the wiping element, which pressure-distributing superstructure comprises at least one lower member having an inverted V-shaped cross section and an upper member having an inverted V-shaped cross section rockably connected to the lower member by a pair of inturned tabs seated in a pair of notches in the bottom edge of the lower member. The upper and lower members have, at least proximate the rockable connections of these members, congruent cross-sectional shapes and the top of the end of the upper member is disposed further outwardly than its bottom. In accordance with the invention, the lower member has a recess or indentation in its top ridge immediately below the end of the upper member.

The above construction permits a close fit between the upper and lower members of the pressure-distributing superstructure at their rockable connection. It also permits free movement or articulation between these members at the rockable joint even though the end of the upper member has, due to its method of fabrication, downwardly projecting burrs or spurs at the bottom of the top of the end of the upper member. It thus results in a product which behaves in a more uniform manner in spite of the variations in manufacture.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figure 1:
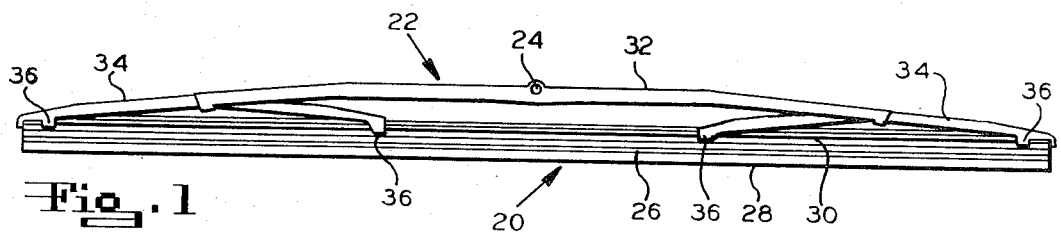
FIG. 1 is a side view of a windshield wiper assembly illustrating an embodiment of the invention.

The windshield wiper assembly shown in FIG. 1 comprises a wiping element indicated generally at 20 and an articulated pressure-distributing means or superstructure, indicated generally at 22, which receives pressure from a wiper arm (not shown but attachable at 24) and then distributes (i.e., transmits and proportions) such pressure to a plurality of positions, spaced locations or longitudinal points along the length of wiping element 20. Wiping element 20 is conformable to both flat and curved surfaces and, when urged toward a windshield by the pressure-distributing superstructure 22, automatically follows surfaces of varying curvatures such as those involved in wiping curved windshields.

Wiping element 20 comprises a resilient wiping member or squeegee 26 which may be made of rubber or other elastomeric material and which has a lowermost or bottom portion which has a wiping edge or lip 28 and a flexible support member or flexor 30 made of resiliently flexible material, such as metal or plastic of suitable thickness. Flexor 30 is maintained in association with the resilient wiping member 26 by various constructions known to the art, such as by retaining it in longitudinal grooves in the resilient wiping member 26.

The pressure-distributing superstructure 22, shown in FIG. 1, comprises a primary or upper member, bridge or yoke 32 which is rockably connected at its ends to secondary or lower members, bridges or yokes 34 at the ends of each of which are claws 36 or other equivalent structures or arrangements which transmit pressure to spaced locations on wiping element 20 and keep the articulated pressure-distributing superstructure 22 in operative association with blade element 20. At least some of the claws slide with respect to blade element 20 so that it can bow or flex without restriction by the pressure-distributing superstructure as it moves across various parts of the windshield. Various means known to the art may be used to prevent the pressure-distributing superstructure 22 from being longitudinally moved or slid off the wiping element in either direction. Those skilled in the art will understand that various arrangements of pressure-distributing superstructures other than that shown in FIG. 1 may be used in accordance with the invention. Such arm-pressure distributing superstructures characteristically transmit the arm pressure to the wiping element adjacent the end of the wiping element and to at least one intermediate location spaced along its length and comprise elongate members rockably connected together to form an articulated structure whose members move relative to each other generally in a plane perpendicular to the surface to be wiped. The windshield wiper assembly may be constructed so that the wiping element 20 can be replaced, and appropriate construction being shown in U.S. Pat. No. 2,897,530, issued Aug. 4, 1959, to John W. Anderson.

Figure 3:
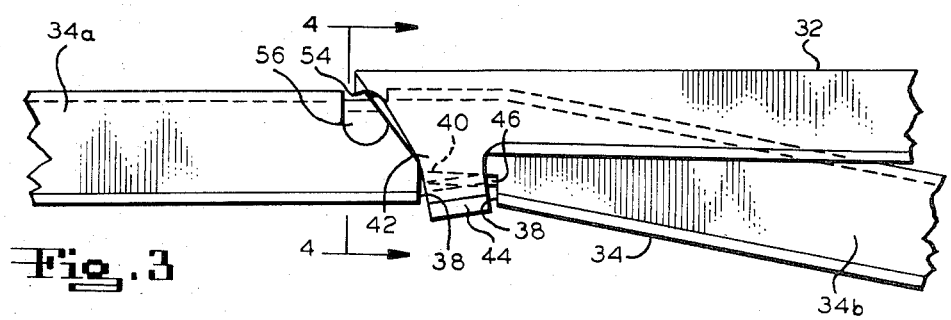
FIG. 3 is a greatly enlarged side view of the connection of the upper member to a lower member of the pressure-distributing superstructure of the windshield wiper assembly of FIG. 1.
Figures 4, 5:
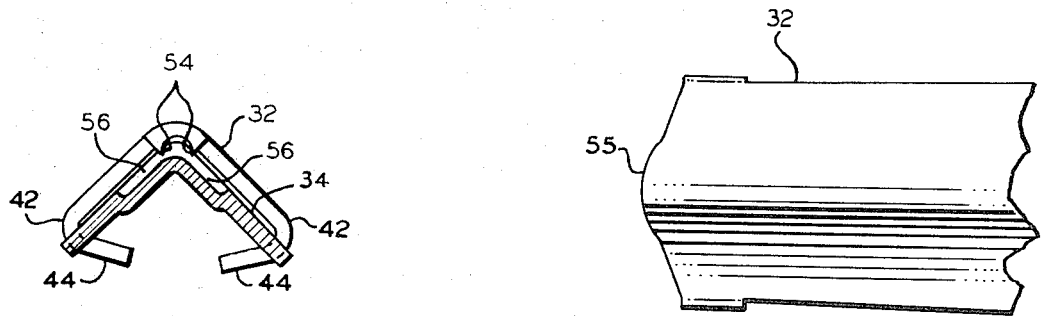
FIG. 4 is a greatly enlarged cross-sectional view taken along the lines 4—4 of FIG. 3.
FIG. 5 is a greatly enlarged top view of the end of the upper member of the pressure-distributing superstructure of the windshield wiper assembly of FIG. 1.

Upper member 32 and lower members 34 are advantageously constructed so they have generally inverted V-shaped cross sections over most of their lengths and congruent or similar cross-sectional shapes at least proximate their rockable connection (see FIG. 4). Lower member 34 is arched, that is, the outboard portion 34a and the inboard portion 34b are inclined downwardly from the midpoint of member 34 (see FIG. 3). Accordingly, there is space between the inboard portion 34b of the lower member 34 and the underside of the end of upper member 32 so that, when the blade element is flexed upwardly when wiping a curved portion of the windshield, the inboard portion 34b of the lower member can pivot upwardly and nest within the corresponding portion of the upper member 32. A pivotal or rockable connection between members 32 and 34 is effected by notching the lower member on each side of its bottom edges, the sides of the notch being shown at 38 and the top of the notch being indicated by 40 in FIG. 3. Both sides of the upper member 32 have downwardly depending projections or legs 42 which are bent to form inturned fingers or tabs 44 which seat in the notches in the bottom edges of the lower member 34. The planes of the inturned tabs 44 are inclined at a small angle outwardly with respect to the tops 40 of the notches when the windshield wiper assembly is in a straight position (such as that shown in FIGS. 1 and 3) so that the tabs can pivot or rock upwardly about their top inboard edges 46 which are in contact with the tops 40 of the notches in the lower member close to the inboard ends of these notches when the windshield wiper assembly is flexed to wipe a curved section of the windshield.

Parts of the windshield wiper assembly such as members 32 and 34 are efficiently fabricated from thin strips or sheets of metal by the use of a progressive die. A progressive die performs a series of fundamental sheet metal operations at two or more stations during each press stroke in order to develop a work piece as the strip stock moves through the die. Each working station performs one or more distinct die operations. The unwanted parts of the strip are cut out as it advances through the die and one or more ribbons or tabs are left connected to each partially completed part to carry it through the stations of the die. On completion of the operation of forming the part, it is severed or sheared from the ribbons or tabs.

Figure 2:
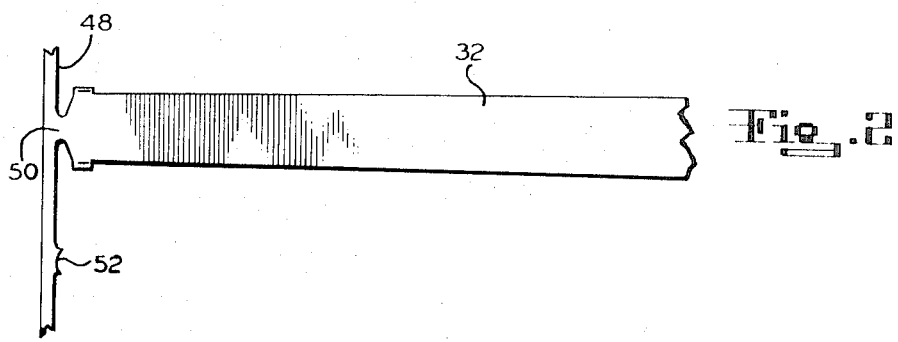
FIG. 2 is a portion of the metal strip from which the upper member of the pressure-distributing superstructure of the windshield wiper assembly of FIG. 1 is formed, illustrating the severing of the end of the upper member from the edge or tab of the metal strip.

FIG. 2 shows the outer end of the upper member after it has been fabricated in a progressive die. The end of member 32 is joined to ribbon 48 by a small piece or strip of metal 50 (the other end of member 32 is held by a similar strip or ribbon on the opposite side of the strip stock). In the next operation of the progressive die, member 32 is severed or sheared from ribbon 48 as indicated at 52. As a result of a shearing operation at 52, a small downwardly projecting burr, spur or spike 54 which may be bifurcated as shown in FIG. 4 is formed on the top or ridge of the member 32 and projects downwardly from the underside of the top of the ridge (see FIGS. 3 and 4). The size of the burr 54 varies during the manufacture of a large number of parts depending upon various factors including the amount of wear on the die, how precisely the die is adjusted, and the variations in the properties of the metal strip stock used.

When the die is not precisely adjusted, the end of the upper member may not be sheared exactly as designed and a small projection 55 is left on the end (see FIG. 5). Projection 55 may also have a burr similar to burr 54.

In the construction shown, the top of lower member 34 is close to the underside of the end of upper member 32 so as to act as a stop to prevent reverse bowing, which can occur when the assembly is handled off of the windshield, and which, when extreme, can result in the separation of the blade element and the superstructure.

In some cases, burr 54 or projection 55 can interfere with the proper rockable movement of members 32 and 34 and cause binding of such movement. This is particularly true when the remainder of the rockable connection is desirably held to close tolerances. When this occurs, the pressure-distributing superstructure does not articulate properly and adversely affects the operation of the wiping element and hence the wiping action.

In accordance with the invention, a recess or indentation 56 is formed in the top ridge of the lower member 34 immediately below the top of the end of the upper member 32. This recess permits members 32 and 34 to rock or pivot relative to each other with burr 54 or projection 55 entering recess 56 without interfering with the proper operation of the rockable connection. Such a construction avoids the expensive operation of deburring or resizing individually each end of member 32. It also has the advantage of stiffening the top ridge of lower member 34.

It will, of course, be understood that various details of construction may be varied without departing from the principles of this invention, and it is, therefore, not the purpose to limit the patent granted herein otherwise than necessitated by the scope of the appended claims.

I claim:

1. A windshield wiper assembly comprising a wiping element and an articulated pressure-distributing superstructure adapted to receive pressure from an arm and distribute the pressure to spaced locations on the wiping element, said pressure-distributing superstructure comprising at least one lower member having an inverted V-shaped cross section and an upper member having an inverted V-shaped cross section, the bottom of the upper member being rockably connected to the bottom of the lower member, said upper and lower members having, proximate the rockable connection of said members, congruent cross-sectional shapes, the top of the end of said upper member being disposed further outwardly than the bottom, said lower member having a recess in its top ridge immediately below the end of said upper member.

2. A windshield wiper assembly comprising a wiping element and an articulated pressure-distributing superstructure adapted to receive pressure from an arm and distribute the pressure to spaced locations on the wiping element, said pressure-distributing superstructure comprising two lower members having inverted V-shaped cross sections and an upper member having an inverted V-shaped cross section rockably connected at its ends to each of the lower members by a pair of inturned tabs seated in a pair of notches in the bottom edges of the lower member, said tabs being positioned so that, in a relaxed condition of the wiper assembly, they are inclined to the edges of notches at small acute angles with the inboard top edge of each tab and the top of each notch in contact close to the inboard end of the notch, said upper and lower members having, proximate the rockable connection of said members, congruent cross-sectional shapes, the top of each end of said upper member being disposed at a small acute outward angle with respect to the bottom, each of said lower members having a small indentation in its top ridge immediately below the end of said upper member.

* * * * *